United States Patent [19]

Nagai

[11] Patent Number: 5,630,211
[45] Date of Patent: May 13, 1997

[54] ROTATING ANTENNA TYPE PORTABLE RADIO APPARATUS

[75] Inventor: Michio Nagai, Tokyo, Japan

[73] Assignee: NEC Corporation, Tokyo, Japan

[21] Appl. No.: 362,160

[22] Filed: Dec. 22, 1994

[30] Foreign Application Priority Data

Dec. 28, 1993 [JP] Japan .................. 5-335272

[51] Int. Cl.⁶ .................................................. H04B 1/38
[52] U.S. Cl. .............. 455/89; 455/90; 455/129; 455/349; 455/351; 379/433; 16/357
[58] Field of Search ................. 455/89, 90, 128, 455/129, 349, 351, 344, 347, 348; 379/58, 428, 433, 429; 16/357; 343/702

[56] References Cited

U.S. PATENT DOCUMENTS

| 1,962,709 | 6/1934 | Case ........................................ 16/265 |
| 2,388,567 | 11/1945 | Patterson ................................ 455/351 |
| 5,337,061 | 8/1994 | Pye et al. ................................ 455/89 |
| 5,513,383 | 4/1996 | Tsao ........................................ 455/90 |

FOREIGN PATENT DOCUMENTS

| 0508299 | 10/1992 | European Pat. Off. . |
| 0508567 | 10/1992 | European Pat. Off. . |
| 0611199 | 8/1994 | European Pat. Off. .............. 455/89 |
| 2601211 | 1/1988 | France ................................. 379/429 |
| 2274046 | 11/1990 | Japan ................................... 379/61 |
| 4298125 | 10/1992 | Japan ................................... 455/89 |
| 4368023 | 12/1992 | Japan . |

Primary Examiner—Reinhard J. Eisenzopf
Assistant Examiner—Doris To
Attorney, Agent, or Firm—Sughrue, Mion, Zinn, Macpeak & Seas

[57] ABSTRACT

A main body of a portable radio apparatus is split into an upper box and a lower box, and the upper box is connected to the upper part of the lower box to be rotatable about a hinge section. An antenna is similarly connected to be rotatable on the hinge section. When the lower body is swung open, the antenna is also swung simultaneously. As the antenna can be further swung, the distance between the head of the user and the antenna can be maximized during communication.

8 Claims, 5 Drawing Sheets

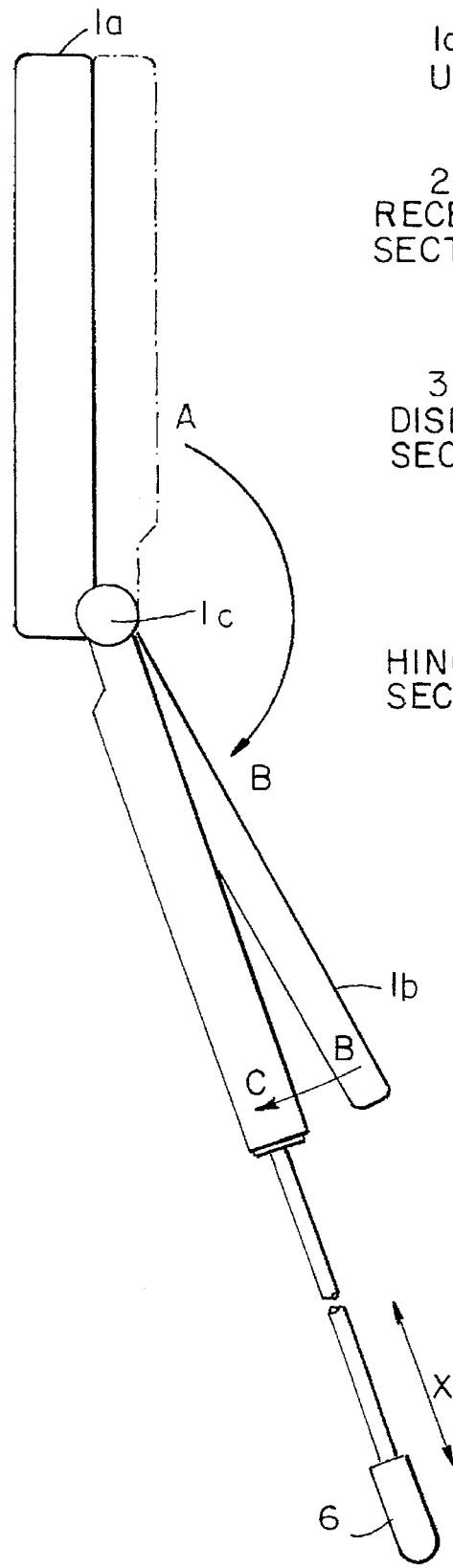
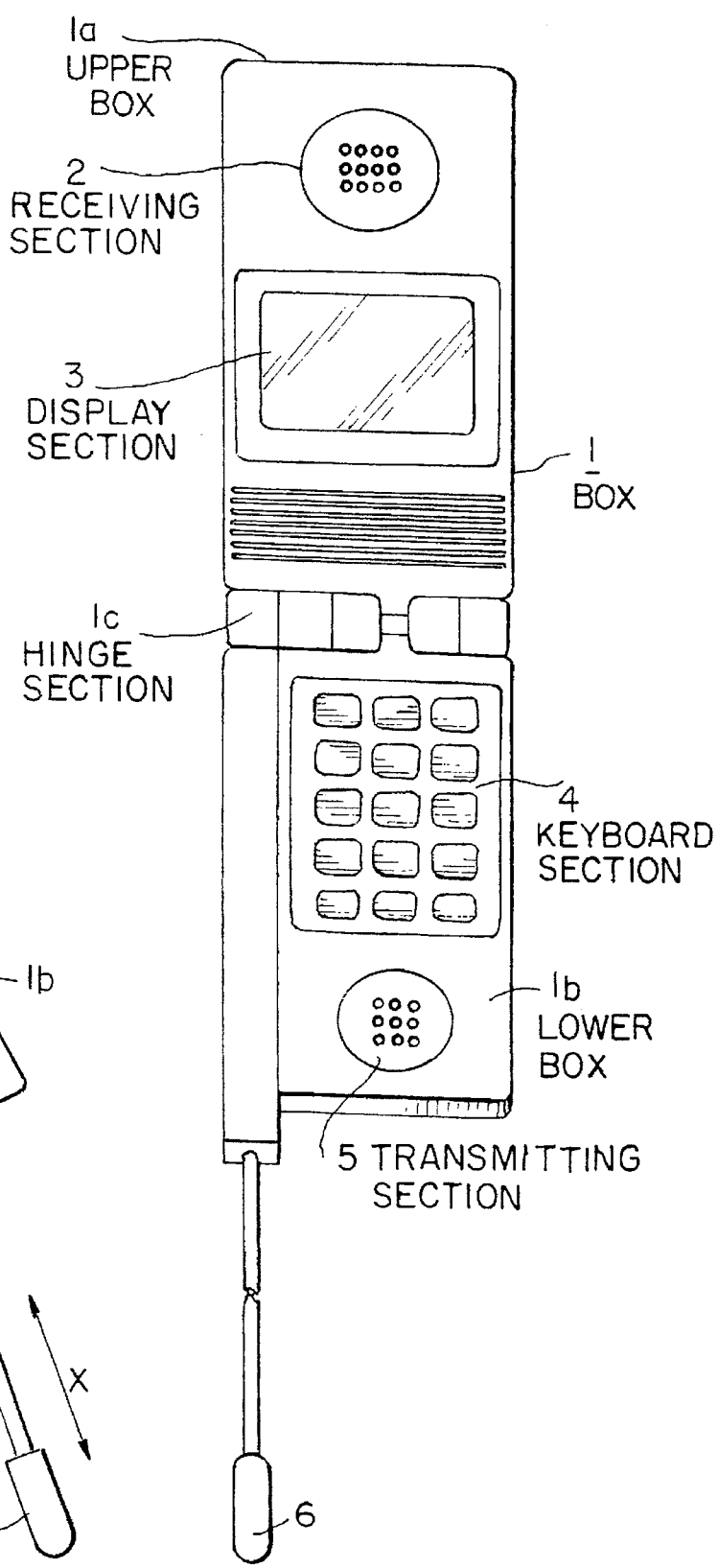

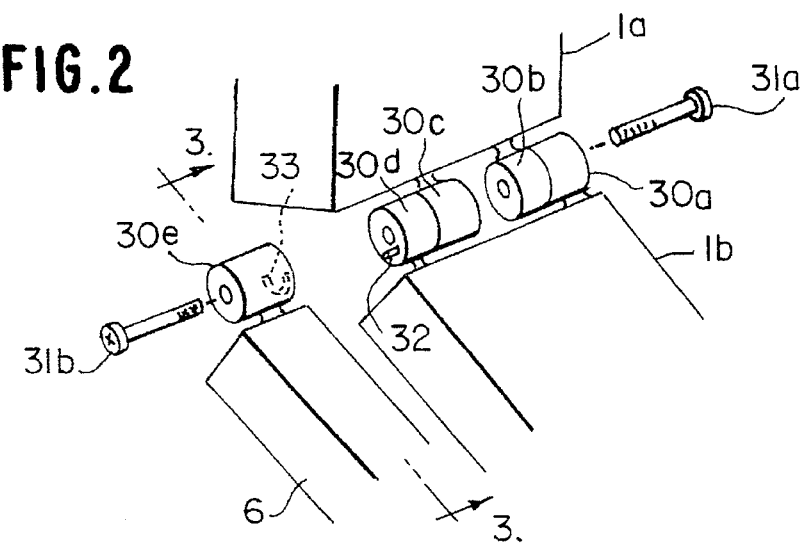
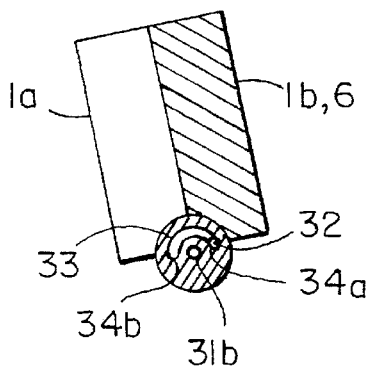
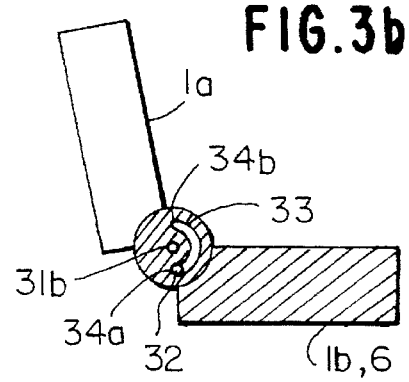
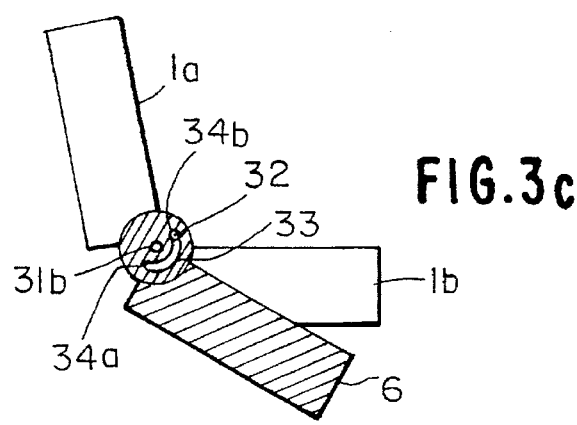

ROTATING ANTENNA TYPE PORTABLE RADIO APPARATUS

BACKGROUND OF THE INVENTION

The present invention relates to a portable radio apparatus and, more particularly, to a portable radio apparatus which is capable of easily orienting the antenna in a position for providing improved gain.

DESCRIPTION OF THE RELATED ART

In a conventional portable radio apparatus, there has been the problem that any radio apparatus used in the vicinity of a human body is subject to the absorption of part of the electromagnetic wave radiated from its antenna by the operator's head and the actual performance of the antenna is thereby deteriorated. Especially where the electromagnetic environment is unfavorable, there may be the fear of being disconnected from the other party.

In view of this problem, there is proposed an improved portable radio apparatus which is described in, for example, Japanese Patent Laid-Open No. 368023/1992 (JP-A-04-368023). Such a portable radio apparatus consists of a first body including a receiving section and a second body including a microphone. A bottom end of the first body is connected to the second body by a first hinge so that the portable radio apparatus is foldable. In addition, a planar antenna is connected to and supported by a second hinge at a top end of the first body so as to rotate from a front face of the first body toward a rear face thereof in order to position the antenna in an operating position.

When the planar antenna is placed in the backward leaning posture during communication, the planar antenna will be displaced from the operator's head, and accordingly the absorption of the electromagnetic wave by the human body is reduced to minimize performance deterioration.

However, the above-described portable radio apparatus has two separately located hinges, one hinge located at the bottom of the first body for opening and closing the two apparatus bodies and the other hinge located at the top of the first body for opening and closing the planar antenna. Therefore, two manual operations are necessary to use the portable radio apparatus. Namely, when it is to be used, the first body including the receiving section must first be pivoted to an open position and the antenna must thereafter be pivoted to an open position.

SUMMARY OF THE INVENTION

It is therefore an object of the present invention to provide a portable radio apparatus including a rotatable antenna which is capable of reducing the adverse effects of interference by the human body on the antenna and of allowing the first body and the antenna to be rotated to the opened position simultaneously.

A rotating antenna type portable radio apparatus, according to the present invention, includes a first body having at least a receiving section, a second body and a hinge section for connecting said first body and said second body in a rotatable manner. The antenna is installed freely rotatable on the hinge section.

The antenna may be rotatably positioned on one end of the hinge section or both ends of the hinge section.

BRIEF DESCRIPTION OF THE DRAWINGS

The above and other objects, features and advantages of this invention will become more apparent from the following detailed description taken with the accompanying drawings in which:

FIGS. 1(a) and 1(b) are plan and side views, respectively, of a preferred embodiment according to the present invention;

FIG. 2 is an exploded view showing a structure of the hinge section shown in FIG. 1;

FIGS. 3(a) to 3(c) are cross sectional views taken along line 3—3 in FIG. 2 showing several relations between the pin and the groove;

In the drawings, the same reference numerals denote the same structural elements.

DESCRIPTION OF THE PREFERRED EMBODIMENT

Figure 4B:
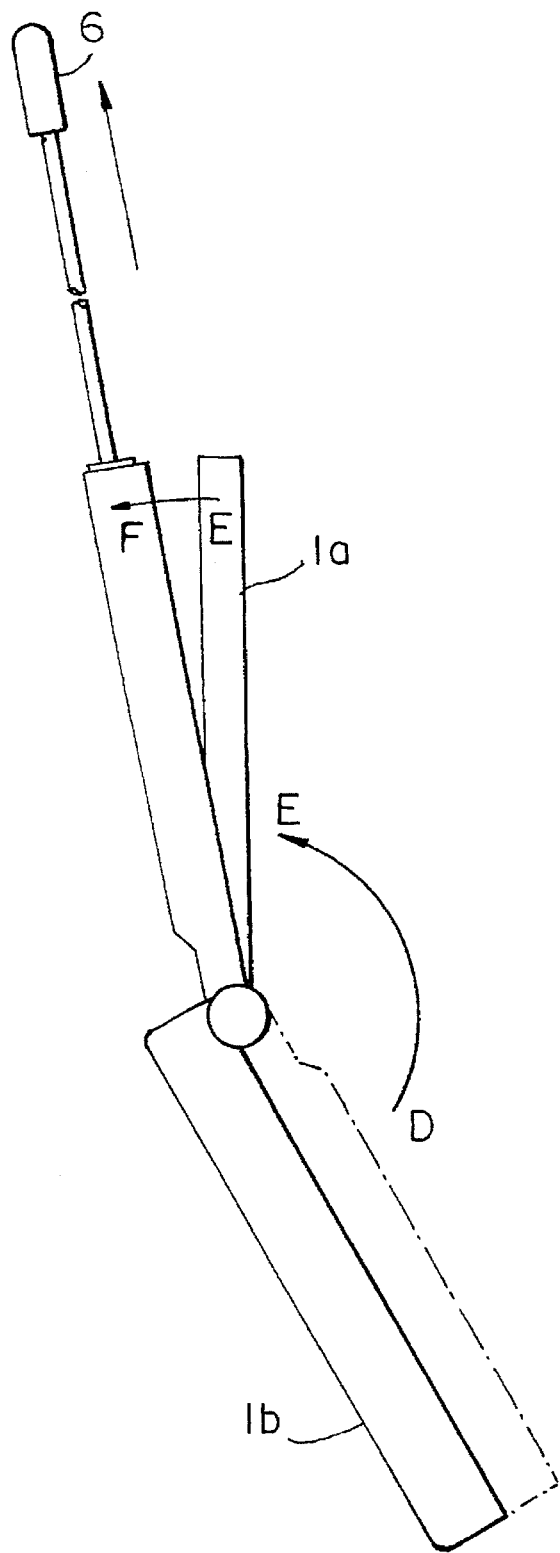
FIGS. 4(a) and 4(b) are plan and side views, respectively, of another embodiment according to the present invention.

FIGS. 1(a) and 1(b) are plan and side views, respectively, of a preferred embodiment according to the invention. A main body or box of a portable radio apparatus is split into an upper box 1a having a receiving section 2 and a display section 3, and a lower box 1b having a keyboard section 4 and a transmitting section 5. A lower portion of the upper box 1a is pivotally connected to the upper portion of the lower box 1b by hinge section 1c. The width of the upper box 1b is greater than that of the lower box 1b. An antenna 6, which is a rectangular type and is adjacent to the lower box 1b, is similarly connected to be pivoted on the hinge section 1c.

When the lower box 1b is rotated from a closed position A (shown by the double dotted chained line) toward an open position B (shown by the solid line), the antenna 6 can also be swung open from the position A toward the position B. The antenna 6 can be further rotated from the position B toward a position C, so that the distance between the head of a user and the antenna 6 can be maximized during communication. Incidentally, the antenna 6 is telescopically provided so that it can be moved in the directions indicated by arrow X.

In the above-described embodiment shown in FIGS. 1(a) and 1(b), it is also possible to arrange the display section 3 in the lower box 1b. Correspondingly, the keyboard section 4 or the transmitting section 5, or both, can be arranged in the upper box 1a.

FIG. 2 is an exploded view showing a structure of the hinge section shown in FIG. 1.

The hinge section 1c shown in FIGS. 1(a) and 1(b) includes hinge portions 30a, 30b, 30c, 30d and 30e and shafts 31a and 31b. Hinge portions 30b and 30c are integral to the upper box 1a, hinge portions 30a and 30d are integral to the lower box 1b, and hinge portion 30e is integral to the antenna 6. The shaft 31a is inserted into receiving holes provided in hinge portions 30a and 30b so that the hinge portions 30a and 30b are rotatable around the shaft 31a as a first rotation axis. The shaft 31b is inserted into receiving holes provided in hinge portions 30c, 30d and 30e so that the hinge portions 30c, 30d and 30e are rotatable around the shaft 31b as a second rotation axis.

A pin 32 is fixedly received in hinge portion 30d so as to protrude therefrom at a predetermined radial distance from the second axis. An arcuate groove 33, in which the pin 32 is received, is formed in the opposing end face of the hinge portion 30e. The arcuate groove 33 extends over a predetermined angle with the second axis as a center and at the same radial distance as the pin such that the pin 32 is slidable in the groove 33. Therefore, the antenna 6 is rotatable independent of the lower box 1b over the predetermined angle (see FIG. 3(c)). On the other hand, the antenna 6 is rotatable together with the lower box 1b as shown in FIGS. 3(a) and 3(b).

FIGS. 3(a) to 3(c) are cross-sections taken along line 3—3 shown in FIG. 2. FIG. 3(a) is a diagram showing a relation between the pin 32 and the groove 33 in a condition where the main box 1 is closed. FIG. 3(b) is a diagram showing a relation between the pin 32 and the groove 33 in a condition where the main box 1 is opened and the lower box 1b and antenna 6 are at the same angular position. FIG. 3(c) is a diagram showing a relation between the pin 32 and the groove 33 in a condition where the main box 1 is opened and the antenna 6 is further rotated to the operating position.

In FIG. 3(a), the groove 33 has a first end 34a, which is in touch with the pin 32 when the main box 1 is closed, and a second opposite end 34b. As shown in FIG. 3(b), when the lower box 1b is opened, since the pin 32 abuts against the first end 34a of the groove 33, the antenna 6 is automatically opened together with the lower box 1b. The antenna 6 can be further rotated to a position at which the second end 34b abuts the pin 32 beyond the position of the lower box 1b, as shown in FIG. 3(c).

On the other hand, when the lower box 1b is pushed toward the upper box 1a to the closed position, since the pin 32 pushes the second end 34b of the lower box 1b, the antenna 6 is rotated together with the lower box 1b toward the upper box 1a. On the other hand, when the antenna 6 is pushed, since the pin 32 is pushed by the first end 34a, the lower box 1b is rotated toward the upper box 1a together with the antenna 6.

As described above, since one hinge section is used for rotating the antenna and either the upper box or the lower box, and the groove and the pin are, respectively, provided on the hinge portions of the antenna and the corresponding lower or upper box, an opening action or closing action of the antenna and the box is executed in a serial action.

Figure 4A:
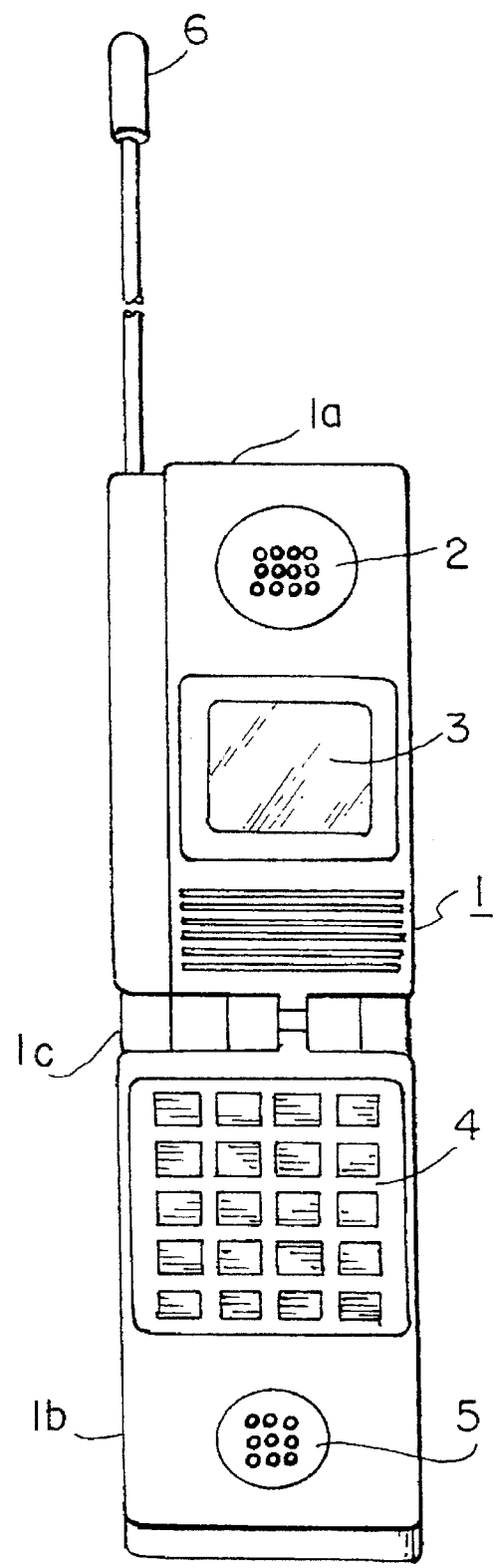

FIGS. 4(a) and 4(b) are plan and side views, respectively, of another preferred embodiment according to the present invention. In this embodiment, the width of the lower box 1b is greater than that of the upper box 1a and the antenna 6 is adjacent to the upper box 1a. When the upper box 1a is swung open from the closed position D (shown by the double dotted chained line) toward an open position E (shown by the solid line), the antenna 6 is also automatically swung open from the position D to the position E. Furthermore, the antenna 6 can be further rotated from the position E to a position F, so that the distance between the head of the user and the antenna 6 is maximized during communication thereby minimizing interference by the operator's body. Incidentally, it is also possible to arrange either the display section 3 or the keyboard section 4, or both, in the lower box 1b. Further, the antenna 6 is telescopically provided.

Figure 5:
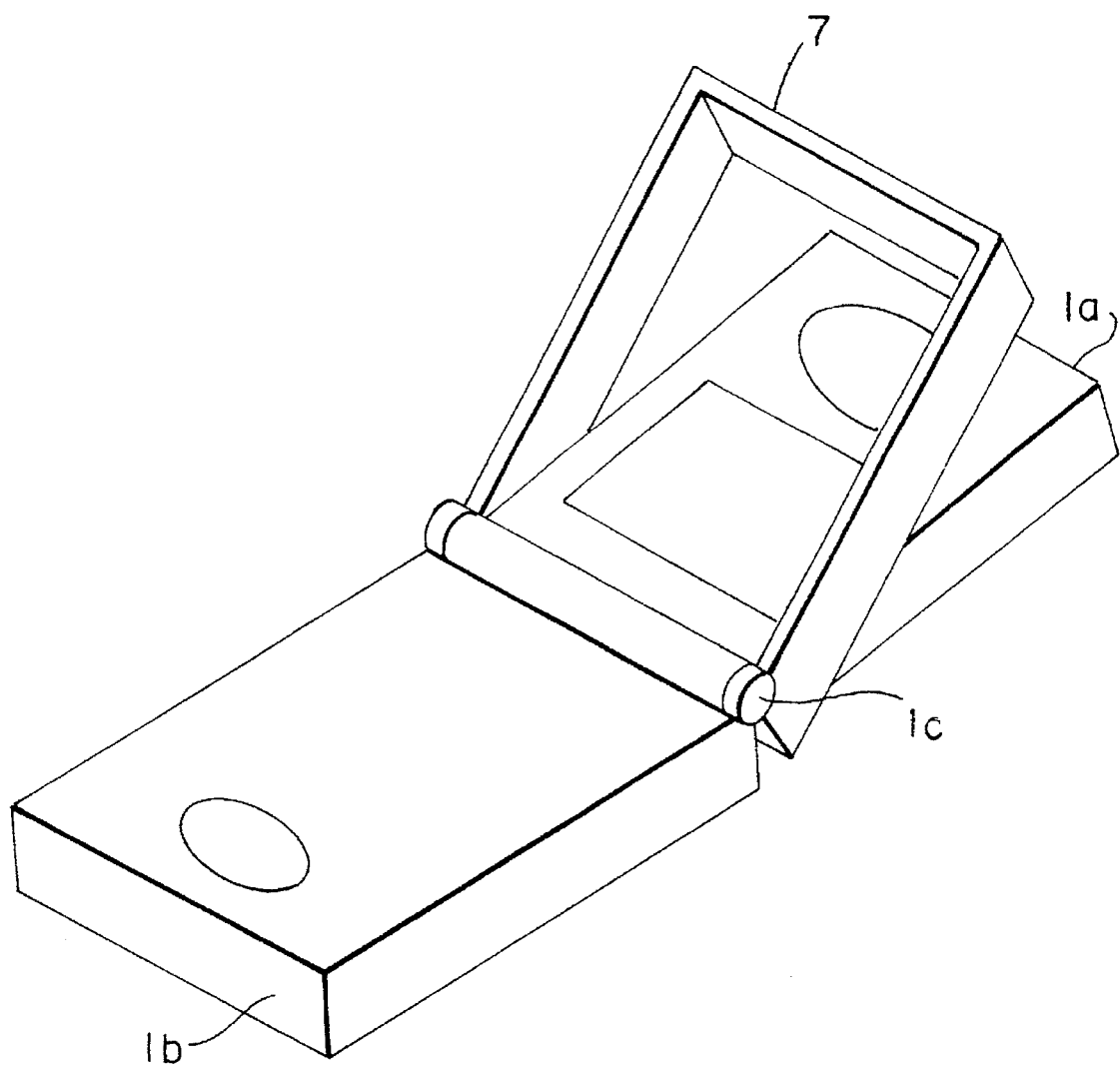
FIG. 5 is a perspective view of a variation of an embodiment according to the present invention.

In these embodiments described above, as illustrated in FIG. 5, it is also possible to install an antenna 7, spanning the upper box or the lower box, on both sides of the hinge section 1c.

Figure 6:
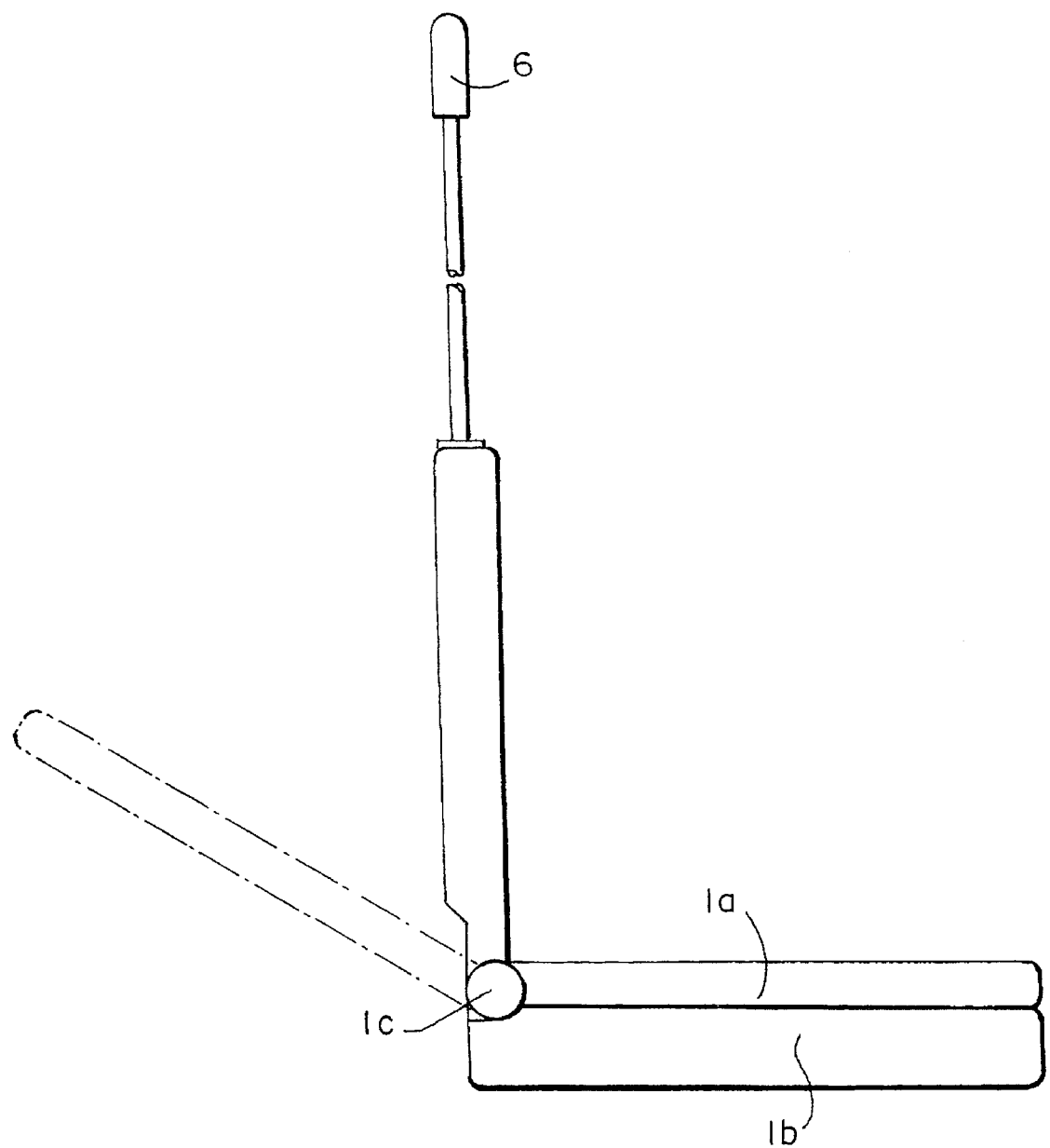
FIG. 6 is a side view for describing one example of the state of use according to the present invention.

Furthermore, in these above-described embodiments, as shown in FIG. 6, when the boxes 1a and 1b are closed and laid horizontally, the antenna 6 can be rotatably positioned irrespective of the position of the upper box 1a.

As hitherto described, since the hinge section, of a portable radio apparatus according to the present invention, for rotating the upper and lower boxes is also used for rotating the antenna, the antenna is automatically rotated when the upper or lower box is rotated, thereby simplifying the operation of using the portable radio apparatus. In addition, the portable radio apparatus makes it possible to maximize the distance between the antenna and the body of the user during communication, so that the antenna is substantially free from the adverse influence of the human body. Therefore, the antenna gain does not drop and the sensitivity of the portable radio apparatus does not decline.

Furthermore, when the portable radio apparatus is installed in a car-mounted receptacle, the antenna position can be so set as to avoid a drop in antenna gain.

Although the embodiments described herein have been described with respect to a specific arrangement, it goes without saying that the present invention is not restricted to such specific arrangements.

What is claimed is:

1. A portable radio apparatus comprising:
    a first body including at least a receiving section;
    a second body;
    a hinge section for connecting said first body and said second body such that said first body can be rotated with respect to said second body from a closed position to an open position; and
    an antenna rotatably installed on said hinge section, wherein said hinge section comprises:
        a first hinge portion integral to said second body;
        a second hinge portion integral to said first body and being rotatably coupled with said first hinge portion;
        a third hinge portion integral to said first body;
        a fourth hinge portion integral to said second body and being rotatably coupled to said third hinge portion;
        a fifth hinge portion integral to said antenna, and
        coupling means for mechanically coupling said fifth hinge portion with one of said third and fourth hinge portions;
    wherein said antenna is rotatable when said first and second bodies are closed, and
    wherein said antenna rotates in response to rotation of a corresponding one of said first and second bodies.

2. The apparatus as claimed in claim 1, wherein said antenna is secured at one end of said hinge section.

3. The apparatus as claimed in claim 2, wherein said first body includes a display section and said second body includes a keyboard section and a transmitting section.

4. The apparatus as claimed in claim 1, wherein said antenna is secured at both ends of said hinge section.

5. The apparatus as claimed in claim 1, wherein said coupling means comprises:
    a pin provided in one of said third and fourth hinge portions and extending from an end face thereof; and
    a groove formed in an opposing end face of said fifth hinge portion in which said pin is received, said groove extending over a predetermined angle.

6. The apparatus as claimed in claim 5, wherein one end of said groove is pushed by said pin when said corresponding one body is opened, so that said antenna is rotated with said corresponding one body.

7. The apparatus as claimed in claim 6, wherein an opposite end of said groove is pushed by said pin when said corresponding one body is closed, so that said antenna is rotated with said corresponding one body.

8. The apparatus as claimed in claim 7, wherein said antenna is further rotatable by said predetermined angle until said pin abuts against one of said ends of said groove in a condition when said first and second bodies are fixed.

* * * * *